United States Patent Office

3,714,715
Patented Feb. 6, 1973

3,714,715
GRINDING CONTROL SYSTEM
Loring Coes, Jr., Princeton, Mass., assignor to
Norton Company, Worcester, Mass.
Filed May 25, 1971, Ser. No. 146,756
Int. Cl. G01b 7/28
U.S. Cl. 33—174 R    9 Claims

ABSTRACT OF THE DISCLOSURE

A method for determining and controlling the distance between a variable surface and a point on a device which contacts the variable surface, requiring measurement or control solely of quantities relating to the contacting device where a reference point A on the contacting device is constrained to move along a line A' and a point of contact P from the contacting device is constrained to follow the variable surface and the angle $\phi$ between the line of constraint A' and a radial line R between the points A and P has a non-zero value. The method requires the measurement of at least four of the following five quantities: the length of line A' from a reference plane to point A, the length of the radial line R, the angle $\phi$, the force F acting upon the reference point A due to the contact of the contacting device with the variable surface measured along the line of constraint A', and the torque T due to the contact with the variable surface which acts around the point A. Once these quantities are measured, the distance B between the variable surface and the point A along the line of constraint A' may be determined by using the equations $B = A' + R \cos \phi$ and $T = FR \sin \phi$. Control of the quantities shown in the above equations can, of course, control the distance B.

BACKGROUND OF THE INVENTION

This invention relates to a method for measuring the relative distance between a point on a contacting device and a variable surface which moves transversely with respect to the contacting device and a system for controlling this distance. The measurement of this distance allows for a feedback of information to a system which controls the point of contact with the variable surface so that the pressure of this contact can be kept uniform. Therefore, the invention relates to inter alia machining tools and a suspension system.

So far as the applicant is aware, all methods previously used for the purpose of determining the distance between a variable surface and a point on a device contacting this surface have made use of a third element which is neither the contacting device nor the variable surface. Whether this third element is a direct contact device such as a stylus, or uses other means such as capacitance, inductance or radiation measurements, it introduces complexities in that the third element must, itself, be positioned by signals from the surface it locates. This location of the locating instrumentality, i.e., the third element, introduces a redundancy in the measuring system which it would be obviously advantageous to eliminate.

Further, it can be proven mathematically that the measurement of distances, angles, and rates of change alone between the coordinate systems of the contacting device and the variable surface cannot determine the distance between the variable surface and a point on the contacting element.

SUMMARY OF THE INVENTION

In view of the disadvantages of the prior art discussed above, it is an object of the applicant's invention to provide a method for measuring the distance between a point on a contacting device and a variable surface by making measurements solely connected with the contacting device.

It is a further object of applicant's invention to provide a novel means for controlling the relative positions between the contacting element and the variable surface.

In applicant's invention, it is assumed that a reference point A on the contacting device is constrained to move, if at all, along a line of constraint A' and that a contacting point P on the contacting device is constrained to follow the variable surface during relative transverse movement between the contacting point P and the variable surface.

For convenience in presenting and understanding this invention, it will further be assumed that the constraining line A' is both straight and perpendicular to the point of contact P with the variable surface. It should be noted, however, that these latter limitations are not essential to the operation of applicant's invention. In addition, it is assumed that the angle $\phi$ between the line of constraint and the radial line R between the points P and A, has a non-zero value.

With the preceding assumptions in mind, applicant's invention lies in measuring at least four of the following five quantities to provide a precise measurement of the distance B between the variable surface and reference point A on a device which contacts the surface: (1) the length of the line A' from a reference point to point A, (2) the length of the radial line R between the points A and P, (3) the angle $\phi$, (4) the force F acting on the reference point A along the line of constraint A' due to contact with the variable surface, and (5) the torque T acting around the point A due to contact with the variable surface. Knowing these quantities, distance B can be determined from the equations:

(1) $B = A' + R \cos \phi$ and (2) $T = FR \sin \phi$

Of course, the control of the above-mentioned factors provide in a given environment, an effective means for controlling the distance B.

BRIEF DESCRIPTION OF THE DRAWINGS

FIG. 1 is a diagram showing the basic principle upon which the applicant's invention operates;

FIGS. 2 and 3 show the utilization of the applicant's invention in a scoring tool.

DETAILED DESCRIPTION OF THE INVENTION

Figure 3:
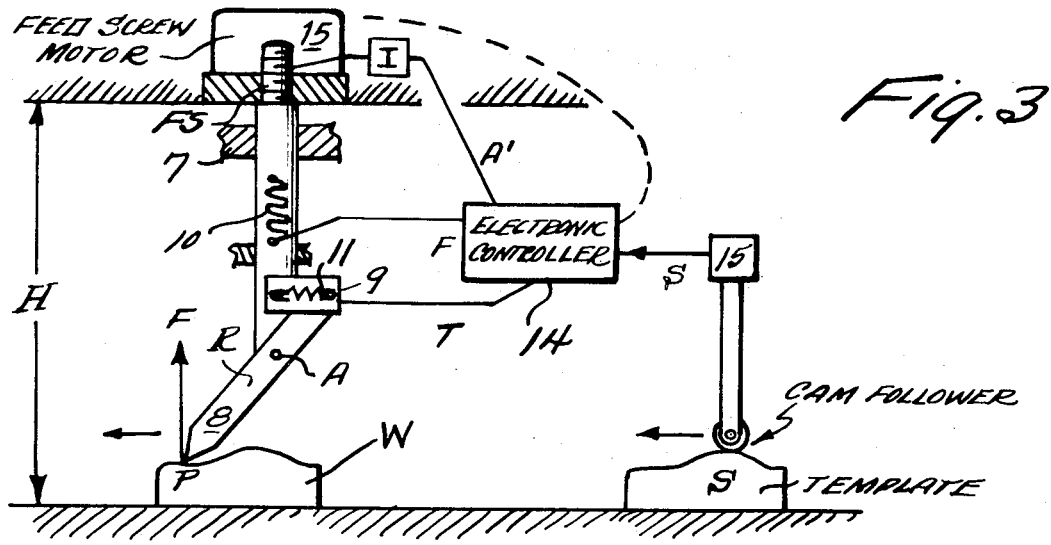
Figure 4:
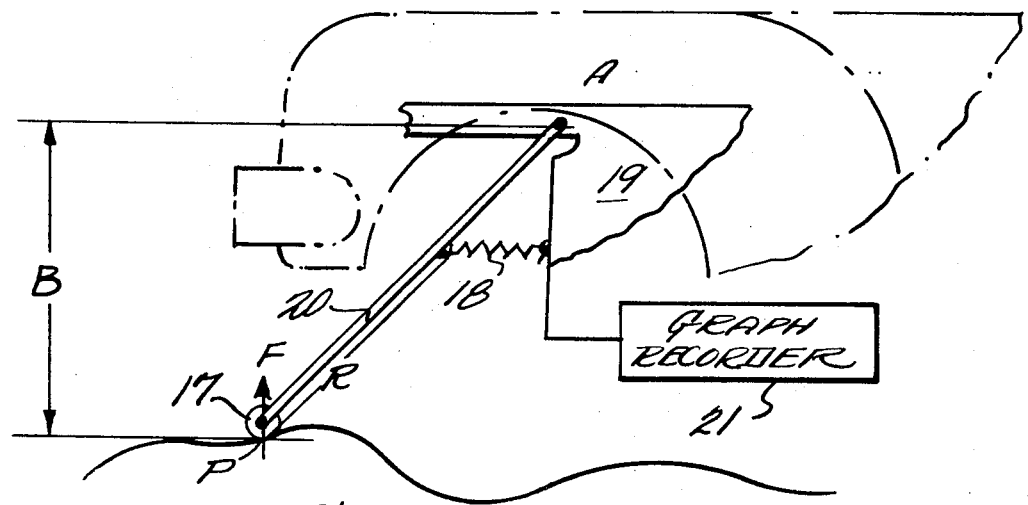
FIGS. 4 and 5 show the utilization of the applicant's invention in a vehicle.
Figure 5:
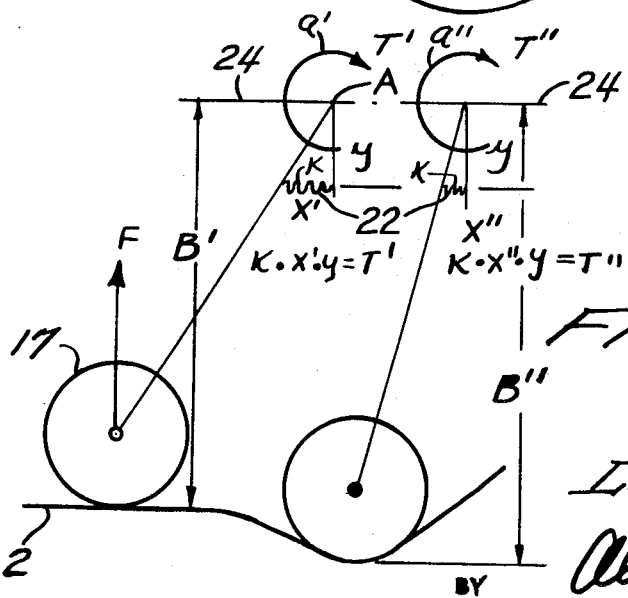

FIG. 1 shows the basic operating principle of applicant's invention. In FIG. 1, reference numeral 1 indicates a reference plane while numeral 2 indicates a variable surface. A contacting device is indicated generally by the reference numeral 3. The point of contact between the contacting device and the variable surface is indicated by the letter P, while the force acting at point P is indicated by the letter F. Force F is transferred by the rigid radial arm R of the contacting device to point A and since the line of constraint A' has been assumed perpendicular to the variable surface, force F acts along this line. In addition, the force F creates a torque T about the reference point A.

The problem with which the applicant's invention is involved is the continuous measurement of the distance B between the reference plane 1 and the variable surface 2, during relative transverse movement between the point P and the variable surface and the control of this distance. To understand the method utilized by the applicant to solve this problem, two equations describing FIG. 1 are needed.

The first equation defines the distance B in terms of the length of the line of constraint A', the length of the for a given spring constant K and a given displacement y around the reference point A and spring 22 along the line of constraint a', the distances X', X" between the line connecting wheel 17 and point A and the frame 24 can be determined which produce the range of torques T'a' and T"a" which exactly balance the torques T' to T". Thus KX'y=T' and KX"y=T". Therefore, if spring 22 has a spring constant K through the range X' to X", the torque is automatically compensated for which holds the force F constant and causes the point A to move in a horizontal line and the wheel 17 to exactly follow the surface 2.

As should be obvious to one skilled in the art, the above embodiments are merely exemplary of the many measurement and control systems which may be produced through the application of the applicant's invention.

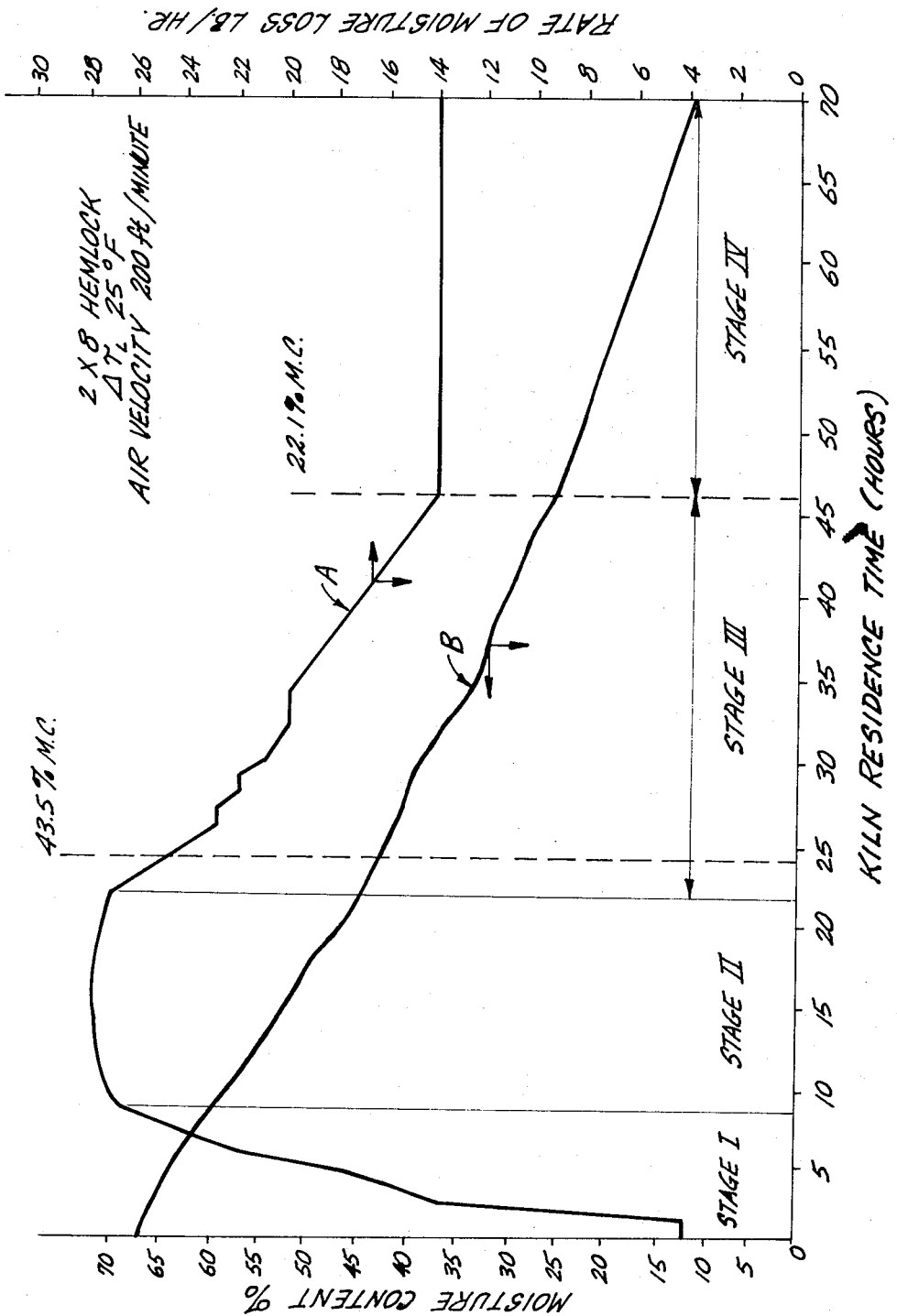

What is claimed is:

1. A method for determining the distance B between a variable surface, a reference plane and a reference point A upon a device which contacts the variable surface at a point P on the end of a rigid arm that pivots about point A, the point P contacting the surface with a force F comprising the steps of:
   (a) constraining the reference point A on the contacting device to move, if at all, along a line of constraint A' that is perpendicular to the reference plane,
   (b) constraining the point P on the contacting device to continuously contact the variable surface so that a line R connecting points P and A intersects line A' at an angle $\phi$ during relative transverse movement between said contacting device and said variable surface,
   (c) constraining the angle $\phi$ between the line of constraint A' and the line R between the points P and A to have a positive value,
   (d) measuring at least four of the following five quantities: the length, if any, of the line of constraint A' from the reference plane to point A; the length of line R; the angle $\phi$; the force F acting upon the reference point A to cause it to move along the line of constraint A' and the torque T acting to turn the arm around reference point A, and
   (e) determining the distance B by using the equations $B = A' + R \cos \phi$ and $T = FR \sin \phi$.

2. The method of claim 1 wherein the quantity R is treated as a random unknown variable and thus the equations simplify to $$B = A' + \frac{T}{F} \cot \phi$$

3. The method of claim 1 wherein the quantity $\phi$ is treated as a random unknown variable and thus the equations simplify to $$(B-A)^2 + \left(\frac{T}{F}\right)^2 = R^2$$

4. The method as claimed in claim 2 wherein the quantity $\phi$ is constant and thus only the quantities A', T and F need to be monitored to determine the distance B as the surface varies.

5. The method as claimed in claim 3 wherein the quantities A', R and F are constants and thus only the quantity T need be monitored to determine the distance B as the surface varies.

6. A method for controlling the distance B between a variable surface, a reference plane and a reference point A upon a device which contacts the variable surface at a point P on the end of a rigid arm that pivots about point A, the point P contacting the surface with a force F comprising the steps of:
   (a) constraining the reference point A on the contacting device to move, if at all, along a line of constraint A' that is perpendicular to the reference plane,
   (b) constraining the point P on the contacting device to continuously contact the variable surface so that a line R connecting points P and A intersects line A' at an angle $\phi$ during relative transverse movement between said contacting device and said variable surface,
   (c) constraining the angle $\phi$ between the line of constraint A' and the line R between the points P and A to have a positive value, and
   (d) controlling at least four of the following five quantities: the length, if any, of the line of constraint A' from the reference plane to point A; the length of line R, the angle $\phi$; the force F acting on the reference point A to cause it to move along the line of constraint A' and the torque T acting to turn the arm around reference point A.

7. The method as claimed in claim 6 wherein the quantity $\phi$ is constant and thus only the quantities A', T and F need to be continuously controlled to control the distance B.

8. The method as claimed in claim 6 wherein the quantities A', R and F are constants and thus only the quantity T need be continuously controlled to control distance B.

9. A method utilizing the distance B between a variable surface and a given plane including a reference point A upon a device for a control purpose by using a follower which contacts the variable surface to be moved in a transverse relative direction to the surface disposed in a roughly parallel relation to the plane comprising the steps of:
   (a) measuring the distance B between the reference point A and the template of the desired path between the contacting device and the variable surface,
   (b) measuring the actual path between the contacting device and the variable surface by measurements solely related to the contacting device,
   (c) comparing the actual path determined by step (b) with the desired path determined by step (a) and
   (d) controlling the action of the contacting device so as to minimize the difference between the actual and desired paths.

References Cited

UNITED STATES PATENTS

| 2,581,264 | 1/1952 | Levesque | 33—DIG 13 |
| 3,193,940 | 7/1965 | Jenkins | 33—174 P |
| 3,470,739 | 10/1969 | Takafusi et al. | 73—105 |

FOREIGN PATENTS

| 891,374 | 9/1953 | Germany | 33—18 R |

HARRY N. HAROIAN, Primary Examiner

U.S. Cl. X.R.

33—1 R, 23 H; 73—105